United States Patent
Hu et al.

(10) Patent No.: US 10,921,546 B2
(45) Date of Patent: Feb. 16, 2021

(54) DRIVING MODULE AND DRIVING MECHANISM THEREOF

(71) Applicant: TDK TAIWAN CORP., Taoyuan (TW)

(72) Inventors: Chao-Chang Hu, Taoyuan (TW); Liang-Ting Ho, Taoyuan (TW); Sin-Jhong Song, Taoyuan (TW)

(73) Assignee: TDK TAIWAN CORP., Taoyuan (TW)

(*) Notice: Subject to any disclaimer, the term of this patent is extended or adjusted under 35 U.S.C. 154(b) by 202 days.

(21) Appl. No.: 16/257,454

(22) Filed: Jan. 25, 2019

(65) Prior Publication Data
US 2019/0227255 A1    Jul. 25, 2019

Related U.S. Application Data

(60) Provisional application No. 62/621,967, filed on Jan. 25, 2018.

(51) Int. Cl.
| G02B 7/09 | (2006.01) |
| G02B 7/02 | (2021.01) |
| H02K 41/035 | (2006.01) |
| G03B 5/00 | (2021.01) |
| H02K 11/215 | (2016.01) |
| H02K 11/33 | (2016.01) |

(52) U.S. Cl.
CPC .............. *G02B 7/09* (2013.01); *G02B 7/021* (2013.01); *G03B 5/00* (2013.01); *H02K 11/215* (2016.01); *H02K 11/33* (2016.01); *H02K 41/0354* (2013.01); *H02K 41/0356* (2013.01); *G03B 2205/0015* (2013.01); *G03B 2205/0069* (2013.01); *H02K 2203/03* (2013.01)

(58) Field of Classification Search
CPC ... G02B 7/08; G02B 7/04; G02B 7/09; G03B 3/10; H04N 5/2254
USPC .......................................................... 359/824
See application file for complete search history.

(56) References Cited

U.S. PATENT DOCUMENTS

| 2018/0234004 A1* | 8/2018 | Moto .................... G02B 27/646 |
| 2019/0137780 A1* | 5/2019 | Arai .................... H04N 5/23264 |

* cited by examiner

*Primary Examiner* — Mohammed A Hasan
(74) *Attorney, Agent, or Firm* — Muncy, Geissler, Olds & Lowe, P.C.

(57) ABSTRACT

A driving mechanism is provided, including a base unit, a frame, a holder, a first driving assembly, a sensing magnet, and a magnetic field sensor. The base unit has a polygonal structure. The frame is connected to the base unit. The holder is connected to the frame for holding an optical element, wherein the optical element defines an optical axis. The first driving assembly is disposed on the base unit and the frame, close to a first side of the base unit for driving the holder and the frame to move relative to the base unit along a horizontal direction perpendicular to the optical axis. The sensing magnet is disposed on the holder and close to a second side of the base unit, opposite to the first side. The magnetic field sensor is disposed on the base unit for sensing the sensing magnet.

23 Claims, 13 Drawing Sheets

DRIVING MODULE AND DRIVING MECHANISM THEREOF

CROSS REFERENCE TO RELATED APPLICATIONS

The present application claims priorities of U.S. Provisional Application No. 62/621,967, filed on Jan. 25, 2018, the entirety of which is incorporated by reference herein.

BACKGROUND OF THE INVENTION

Field of the Invention

The invention relates to a driving mechanism, and more particularly to a driving mechanism that can move an optical element.

Description of the Related Art

In existing dual-lens camera systems, two lens driving modules are usually arranged close to each other, and as a result, magnetic interference between the magnets of the two lens driving modules is likely to occur, causing the focus speed and accuracy of the lenses to be adversely affected. Therefore, what is needed is a dual-lens camera system that can prevent the magnetic interference between the two lens driving modules.

BRIEF SUMMARY OF THE INVENTION

In view of the aforementioned problems, an object of the invention is to provide a driving mechanism that includes a base unit, a frame, a holder, a first driving assembly, a sensing magnet, and a magnetic field sensor.

The base unit has a polygonal structure. The frame is connected to the base unit. The holder is connected to the frame for holding an optical element, wherein the optical element defines an optical axis. The first driving assembly is disposed on the base unit and the frame, close to a first side of the base unit for driving the holder and the frame to move relative to the base unit along a horizontal direction perpendicular to the optical axis.

Specifically, the sensing magnet is disposed on the holder and close to a second side of the base unit, opposite to the first side. The magnetic field sensor is disposed on the base unit for sensing the sensing magnet.

In some embodiments, the driving mechanism comprises only one first driving assembly, and the first driving assembly is not located close to the second side of the base unit.

In some embodiments, the first side is parallel to the second side, and the center of the sensing magnet is offset from the center of the second side.

In some embodiments, when viewed along the optical axis, the sensing magnet has a round, square, or rectangular shape.

In some embodiments, the base unit includes a substrate and a circuit board disposed on the substrate, and the first driving assembly includes a magnetic element and a coil, wherein the magnetic element is disposed on the frame, and the coil is disposed on the circuit board and corresponds to the magnetic element.

In some embodiments, the magnetic field sensor is disposed on the substrate.

In some embodiments, the magnetic field sensor is disposed on the circuit board, and the substrate has at least a conductive pin electrically connected to the magnetic field sensor.

In some embodiments, the substrate further has a recess with the magnetic field sensor received therein.

In some embodiments, the circuit board electrically connects the conductive pin with the magnetic field sensor.

In some embodiments, the substrate further has an opening, a group of first pads adjacent to each other, and a group of second pads adjacent to each other, wherein the first and second pads are exposed to an inner surface of the opening and electrically connected to the circuit board.

In some embodiments, the first and second pads are located on opposite sides of the opening.

In some embodiments, the center of the magnetic field sensor is offset from the center of the sensing magnet in the horizontal direction.

In some embodiments, the polar direction of the sensing magnet is parallel to the optical axis.

In some embodiments, the driving mechanism further includes a block disposed on the frame and corresponding to the second side of the base unit.

In some embodiments, when the holder moves relative to the frame along the horizontal direction to a limit position, the block contacts and restricts the holder in the limit position.

In some embodiments, when viewed along a direction parallel to the second side, the block and the sensing magnet at least partially overlap.

In some embodiments, the driving mechanism further includes two blocks and a metal sheet connecting to the blocks, wherein the blocks are disposed on the frame and correspond to the second side of the base unit.

In some embodiments, the holder has an extending portion overlapping with the first driving assembly when viewed along the optical axis.

In some embodiments, the center of the magnetic field sensor is offset from the center of the sensing magnet along a direction perpendicular to the horizontal direction and the optical axis.

An object of the invention is to provide a driving module, including two driving mechanisms as mentioned above, wherein the second sides of the base units of the two driving mechanisms are adjacent to each other.

An object of the invention is to provide a driving module, including two driving mechanisms as claimed in claim 1, wherein the driving mechanisms are arranged in a direction, and the second sides of the base units of the two driving mechanisms face in the direction.

An object of the invention is to provide a driving module, including four driving mechanisms as claimed in claim 1, wherein the driving mechanisms are arranged in a 2×2 matrix, and each of the driving mechanisms further comprises a second driving assembly disposed on the holder and the frame, wherein the second driving assembly is close to a third side of the base unit for driving the holder to move relative to the frame along the optical axis.

In some embodiments, each of the driving mechanisms comprises only one second driving assembly, and the second driving assembly is not close to a fourth side of the base unit, wherein the fourth side is opposite to the third side, and the second and fourth sides of the base units of the four driving mechanisms are adjacent to each other.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The making and using of the embodiments of a driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
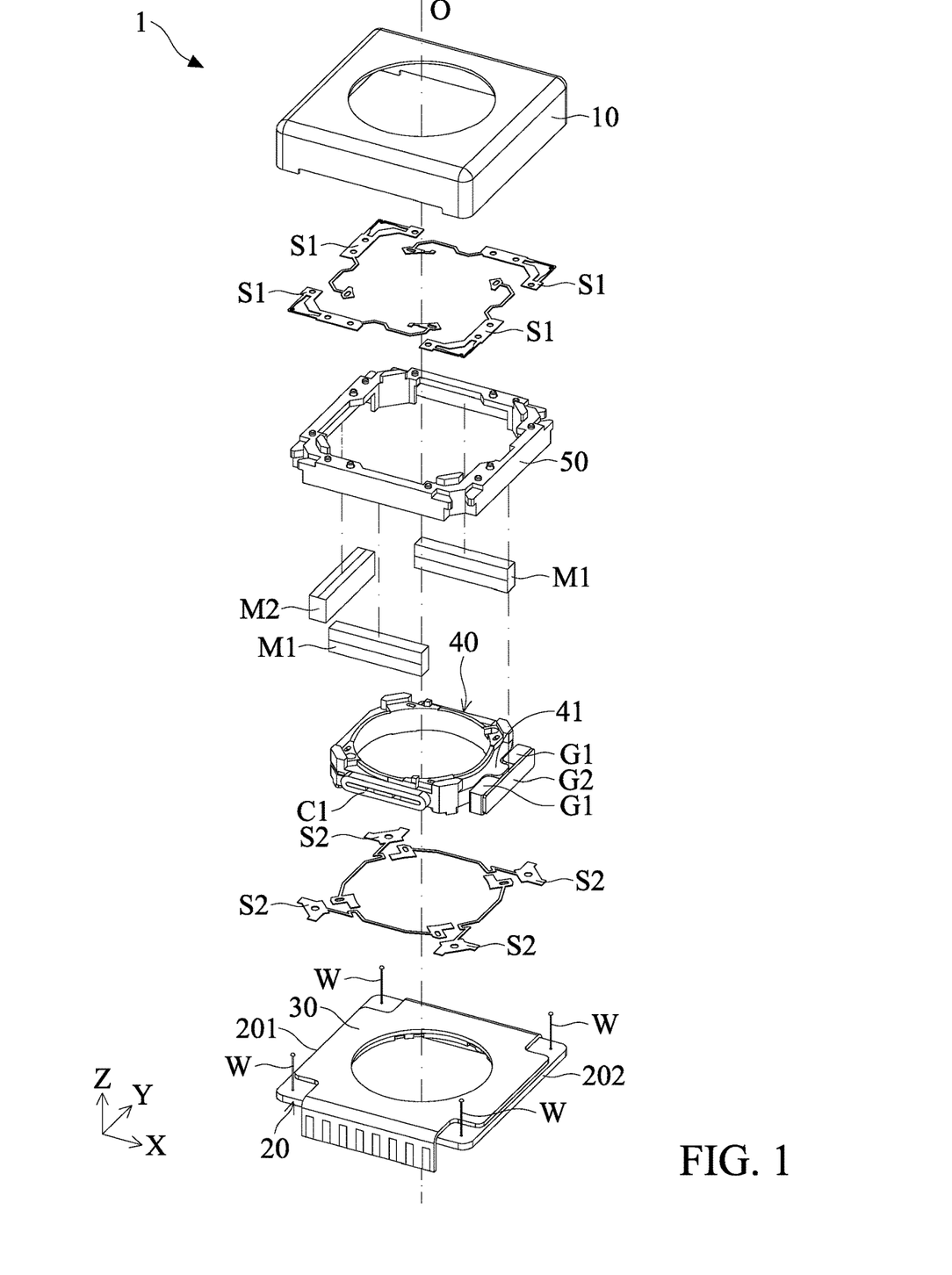
FIG. 1 is an exploded diagram showing a driving mechanism 1 in accordance with an embodiment of the application.
Figure 2:
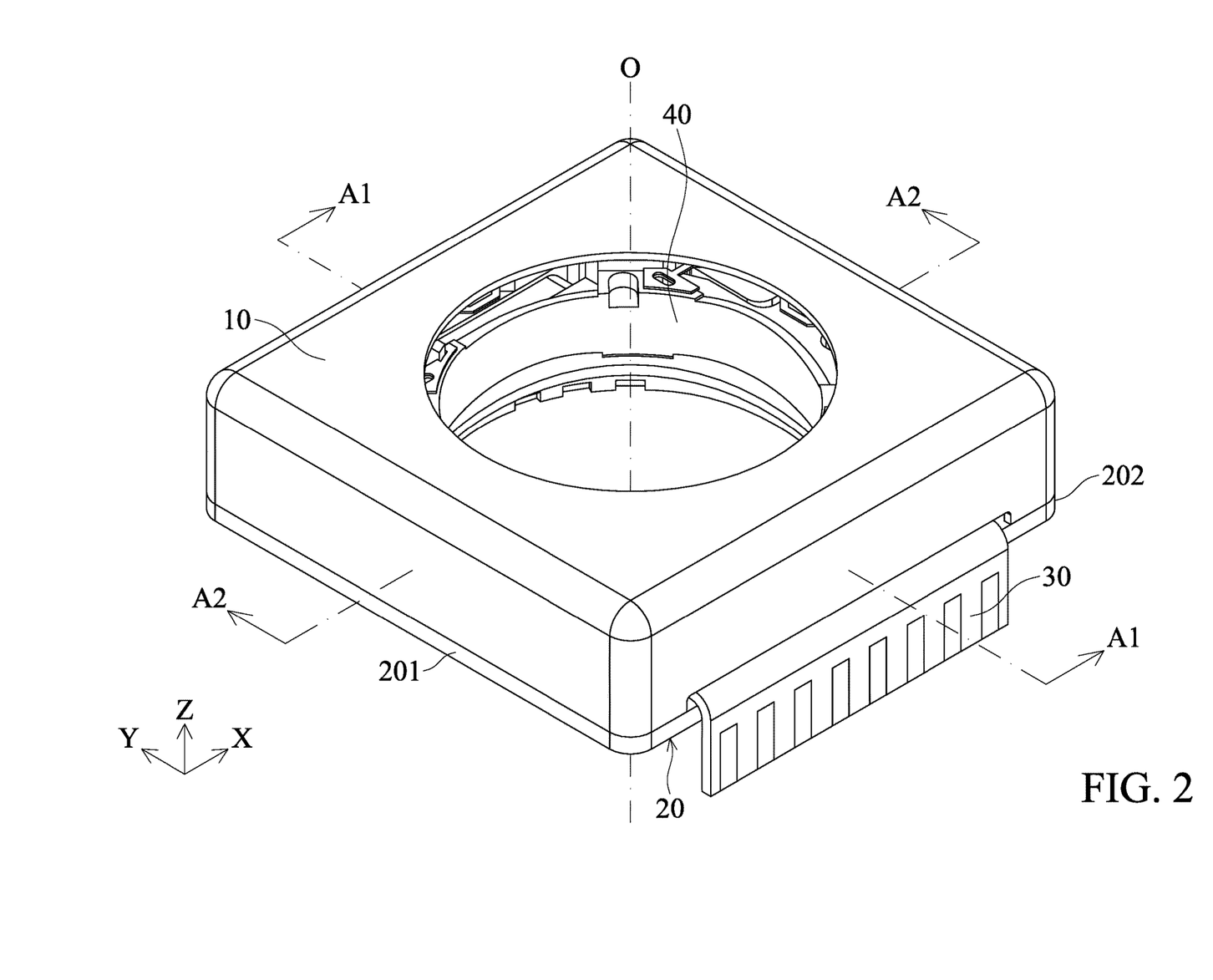
FIG. 2 is a schematic diagram showing the driving mechanism 1 of FIG. 1 after assembly.
Figure 3:
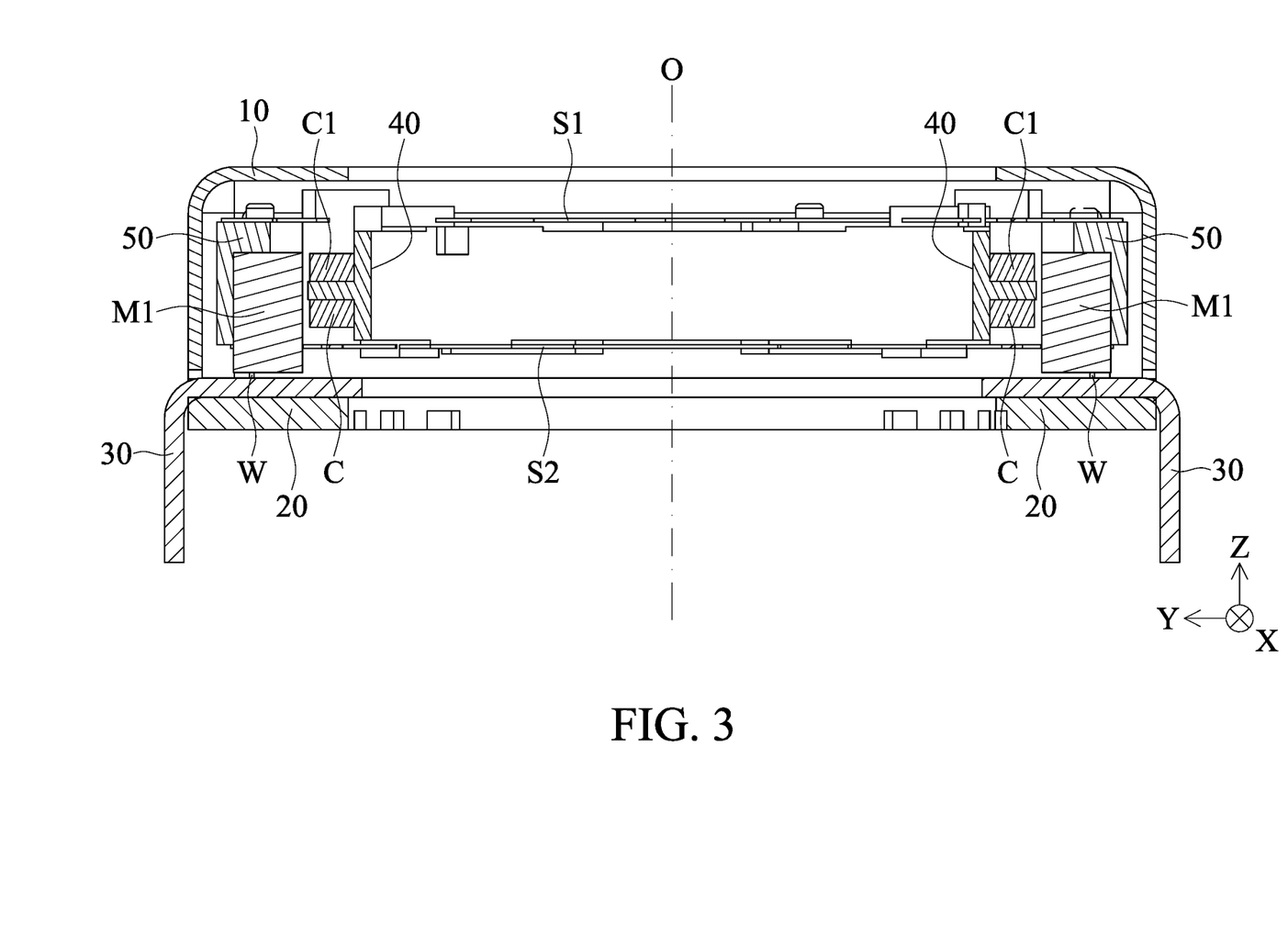
FIG. 3 is a cross-sectional view taken along line A1-A1 in FIG. 2.
Figure 4:
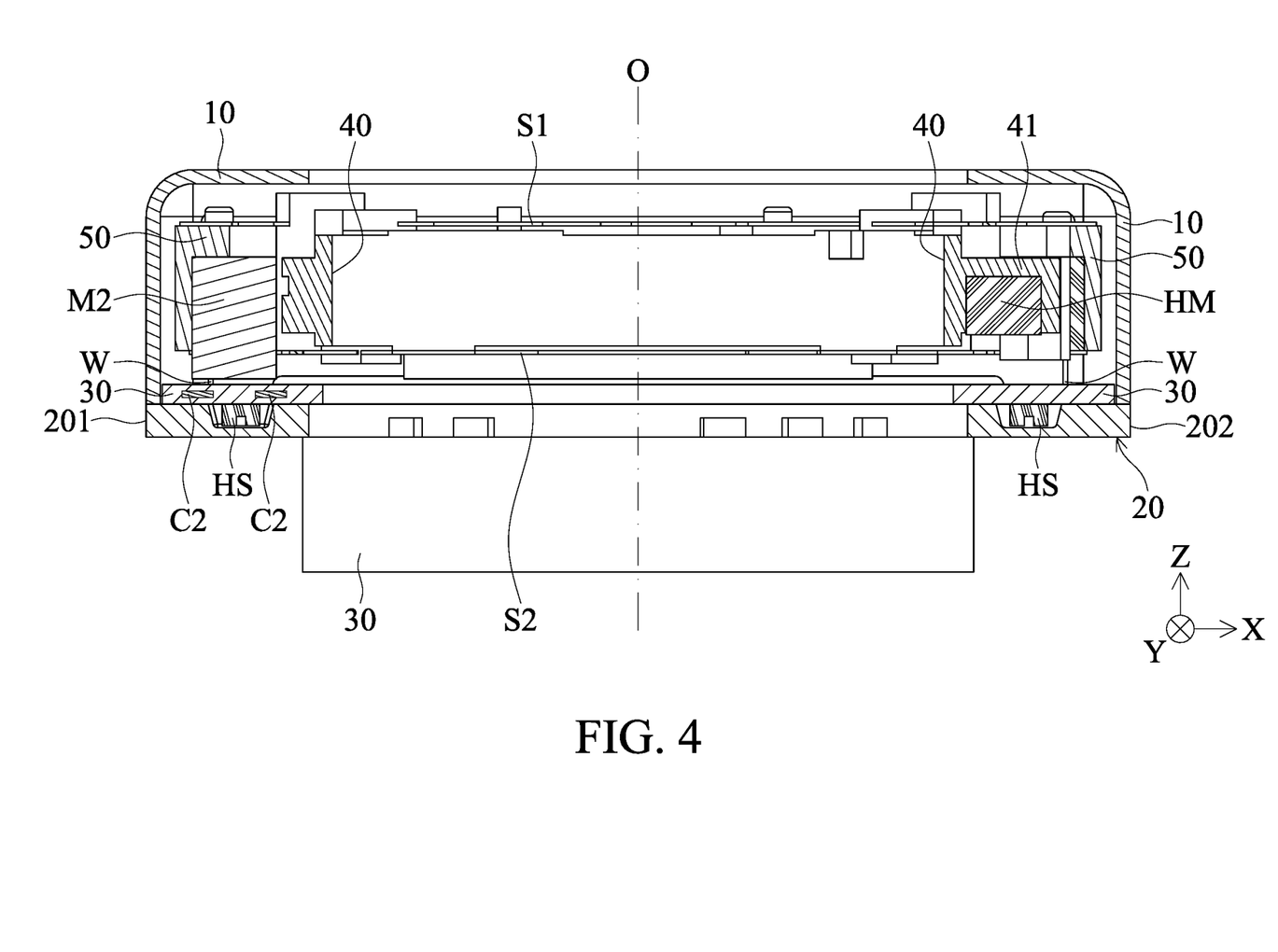
FIG. 4 is a cross-sectional view taken along line A2-A12 in FIG. 2.
Figure 5:
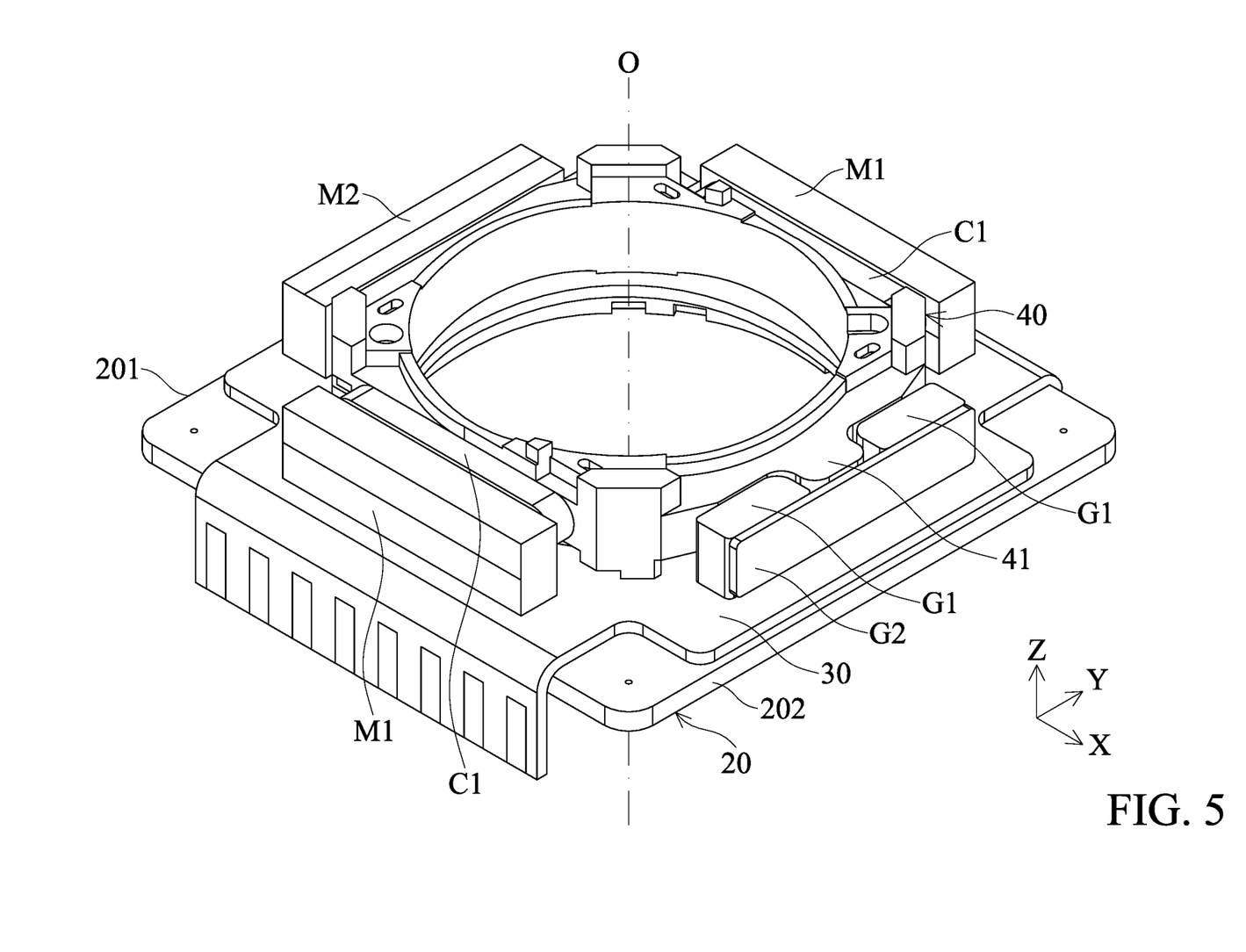
FIG. 5 is a schematic diagram showing the driving mechanism 1 of FIG. 2 with the housing 10, the frame 50, the upper spring S1, the lower spring S2, and the resilient member W removed therefrom.

FIG. 1 is an exploded diagram showing a driving mechanism 1 in accordance with an embodiment of the application. FIG. 2 is a schematic diagram showing the driving mechanism 1 of FIG. 1 after assembly. FIG. 3 is a cross-sectional view taken along line A1-A1 in FIG. 2. FIG. 4 is a cross-sectional view taken along line A2-A12 in FIG. 2. FIG. 5 is a schematic diagram showing the driving mechanism 1 of FIG. 2 with the housing 10, the frame 50, the upper spring S1, the lower spring S2, and the resilient member W removed therefrom.

Referring to FIGS. 1-5, the driving mechanism 1 in this embodiment may be a voice coil motor (VCM) which can be disposed in a camera of a cell phone for driving an optical element to move. The driving mechanism 1 primarily comprises a housing 10, a substrate 20, a circuit board 30, a holder 40, a frame 50, at least an upper spring S1, and at least a lower spring S2.

The holder 40 connects to the frame 50 via the upper and lower springs S1 and S2. An optical element such as an optical lens can be disposed in the holder 40, and two coils C1 are disposed on opposite sides of the holder 40.

The housing 10 is affixed to the substrate 20, and the frame 50 has a rectangular hollow structure movably connected to the substrate 20 by four resilient members W (e.g. thin metal rods). In this embodiment, the substrate 20 and the circuit board 30 constitute a polygonal base unit of the driving mechanism 1.

As shown in FIGS. 1-3 and 5, two magnets M1 are disposed on two opposite sides of the frame 50, parallel to the X axis and adjacent to the coils C1. When electrical currents are applied to the coils C1, electromagnetic forces can be produced by the magnets M1 and the coils C1 for driving the holder 40 and the optical element therein to move relative to the frame 50 along the Z axis, so as to achieve auto-focusing of the camera.

Referring to FIGS. 1-2 and 4-5, a magnetic element M2 (e.g. magnet) is disposed on a side of the frame 50, parallel to the Y axis and close to a first side 201 of the base unit. As shown in FIG. 4, another coil C2 is embedded in the circuit board 30 and located corresponding to the magnetic element M2. Here, the magnetic element M2 and the coil C2 constitute a driving assembly (first driving assembly) for driving the frame 50, the holder 40, and the optical element therein to move relative along the X axis when an electrical current is applied to the coil C2, so as to achieve Optical Image Stabilization (OIS) of the camera.

FIG. 4 further shows a protrusion 41 formed on a side of the holder 40 and close to a second side 202 of the base unit. Specifically, a sensing magnet M3 is disposed in the protrusion 41, and two magnetic field sensors HS (e.g. Hall sensors) are disposed in the circuit board 20 for detecting the magnetic element M2 close to the first side 201 and the sensing magnet M3 close to the second side 202, so that the displacement amount of the holder 40 relative to the base unit along the Z axis can be obtained.

In this embodiment, the polar direction of the sensing magnet M3 is parallel to the optical axis O, and the center of the magnetic field sensor HS is offset from the center of the sensing magnet M3 along a horizontal direction (X direction). Therefore, the magnetic interference between sensing magnet M3 and other components inside or outside the driving mechanism 1 can be efficiently prevented. When viewed along the Z axis, the sensing magnet M3 may have a round, square, or rectangular shape. When the sensing magnet M3 has a longitudinal structure, a longitudinal axis of the sensing magnet M3 is parallel to the second side 20 and the Y axis, so as to facilitate both miniaturization and stability of the driving mechanism 1.

It should be noted that the second side 202 of the base unit is parallel to the first side 201 of the base unit, and the optical axis O of the optical element is located between the first and second sides 201 and 202. Specifically, there is no driving assembly disposed on the second side 202 of the base unit such as the coil C2 and the magnet M2 (first driving assembly) disclose above.

Furthermore, to balance the weight of the driving mechanism 1, a block G1 is disposed on the frame 50. As shown in FIGS. 1 and 5, the driving mechanism 1 in this embodiment comprises two blocks G1 and a metal sheet G2 connecting to the blocks G1, wherein the blocks G1 may be affixed to a side of the frame 50 and close to the second side 202 of the base unit. Since the two blocks G1 can be connected to each other by the metal sheet G2, the protrusion 41 of the holder 40 can be positioned between the two blocks G1 after assembly. That is, when viewed along a direction parallel to the second side 202 (the Y axis), the blocks G1 and the sensing magnet M3 at least partially overlap.

In some embodiments, the blocks G1 and the metal sheet G2 are magnetically impermeable. When the holder 40 moves relative to the frame 50 along a horizontal direction (the X axis) to a limit position, at least one of the blocks G1 may contact and restrict the holder 40 in the limit position.

Figure 6:
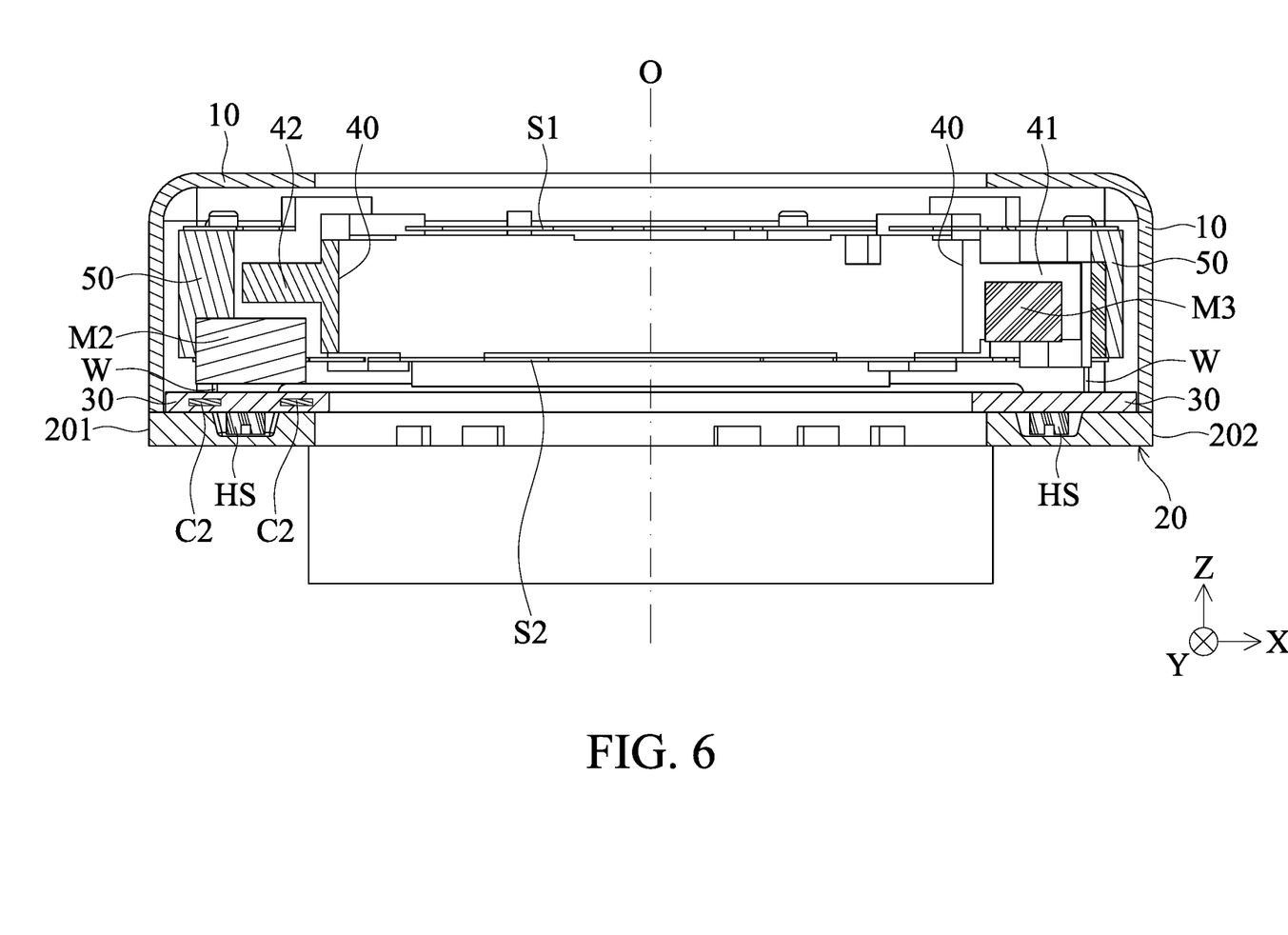
FIG. 6 is a schematic diagram showing a cross-sectional view of a driving mechanism 1 in accordance with another embodiment of the application.

FIG. 6 is a schematic diagram showing a cross-sectional view of a driving mechanism 1 in accordance with another embodiment of the application. As shown in FIG. 6, the holder 40 in this embodiment has an extending portion 42 overlapping with the first driving assembly (the magnetic element M2 or the coil C2) when viewed along the optical axis O.

To increase the electromagnetic force generated by the magnetic element M2 or coil C2 along the X axis, the magnetic element M2 may define a rectangular cross-section, wherein the width of the cross-section along the X axis is greater than the thickness of the cross-section long the Z axis. Additionally, since the extending portion 42 is formed on a side of the holder 40 above the magnetic element M2, the weight of the driving mechanism 1 can be balanced, and the space inside the driving mechanism 1 can be efficiently utilized, so as to facilitate both miniaturization and stability of the driving mechanism 1.

Figure 7:
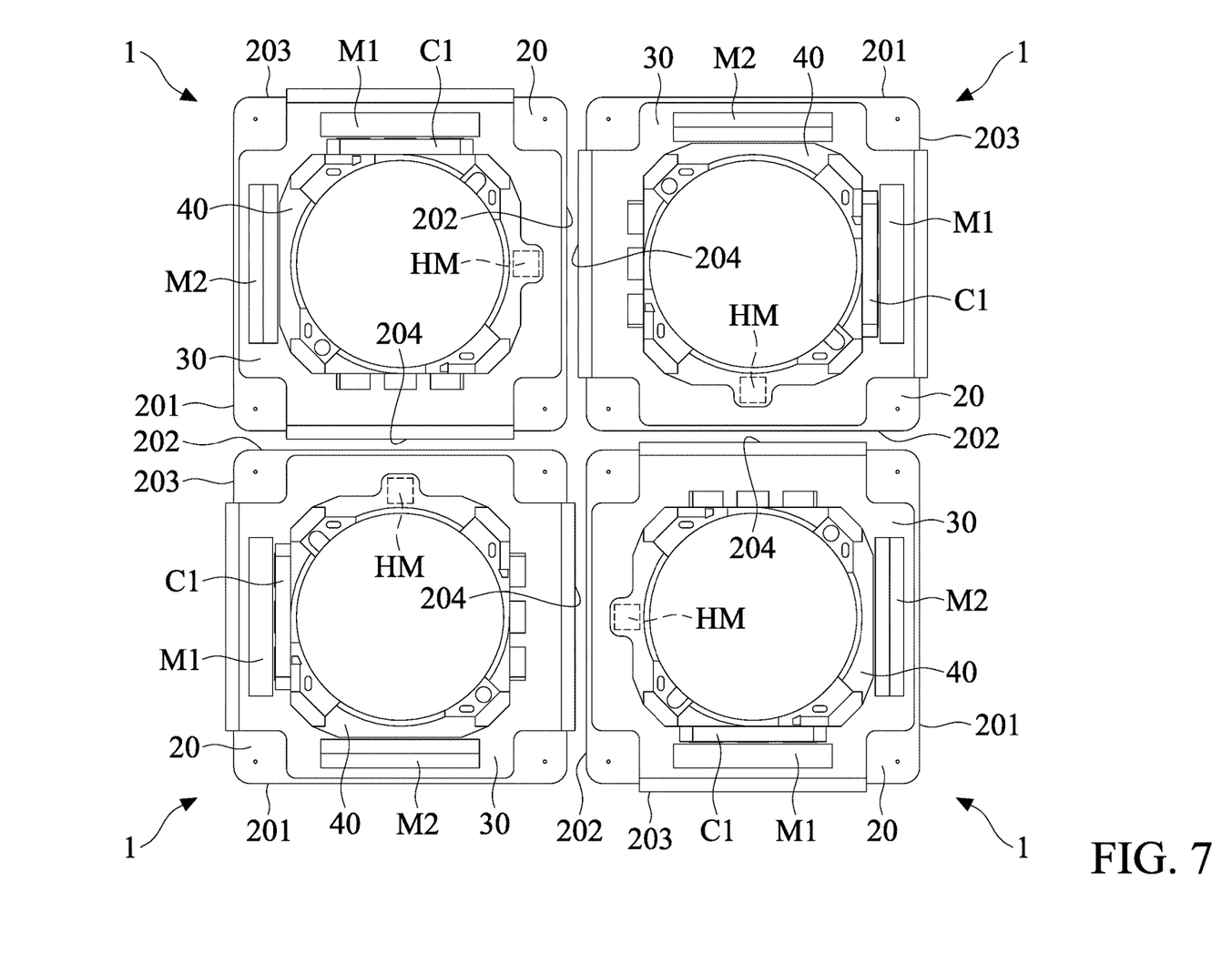
FIG. 7 is a schematic diagram showing a driving module in accordance with another embodiment of the application.

FIG. 7 is a schematic diagram showing a driving module in accordance with another embodiment of the application. The driving module in FIG. 7 comprises four driving mechanisms 1 arranged in a 2×2 matrix. The four driving mechanisms 1 are different from the driving mechanism 1 of FIGS. 1-5 in that each of the driving mechanisms 1 has only one pair of magnet M1 and coil C1 (second driving assembly) close to a third side 203 of the base unit. Specifically, there is no driving assembly (such as the magnet M1 and the coil C1) disposed close to a fourth side 204 of the base unit, wherein the fourth side 204 is opposite to the third side 203.

As shown in FIG. 7, since the four driving mechanisms 1 are spaced close to each other, the driving assembly including large magnetic elements (such as the magnet M1 or the magnetic element M2) is prevented from being disposed close to the second and fourth sides 202 and 204 of the base units of the four driving mechanisms 1, so that the magnetic interference between adjacent driving mechanisms 1 can be avoided, and rapid focusing and high positioning accuracy of the camera can be achieved. Here, the second and fourth sides 202 and 204 of the base units of the four driving mechanisms 1 are adjacent to each other.

Figure 8:
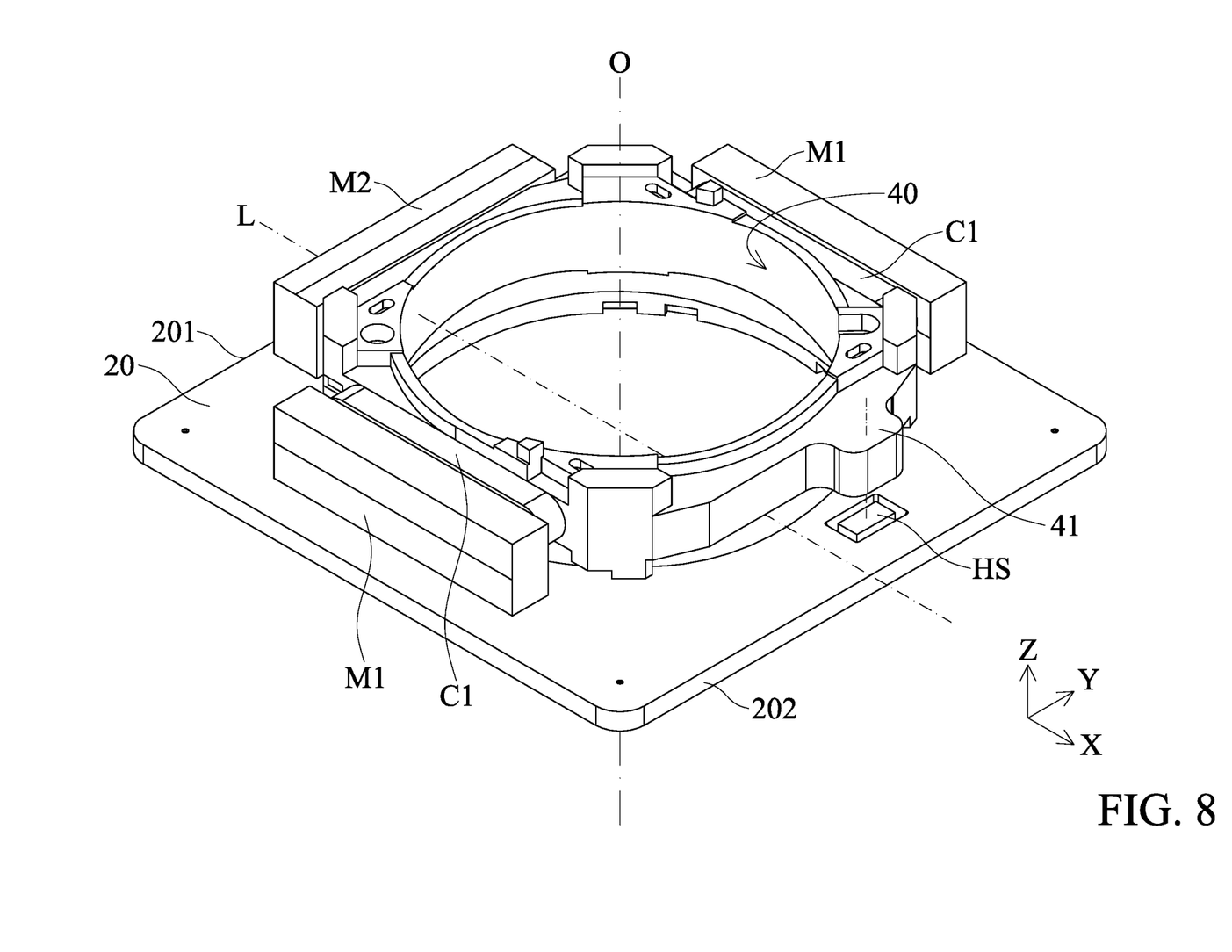
FIG. 8 is a schematic diagram showing some components of a driving mechanism in accordance with another embodiment of the application.

FIG. 8 is a schematic diagram showing some components of a driving mechanism in accordance with another embodiment of the application. FIG. 8 is different from the driving mechanism 1 of FIGS. 1-5 in that the center of the magnetic field sensor HS, the protrusion 41 of the holder 40, and the sensing magnet M3 therein are offset from the center of side 202 of the base unit along the Y axis, as the central line L indicates in FIG. 8.

As mentioned above, since the protrusion 41 of the holder 40 and the sensing magnet M3 efficiently occupy the space beside the central line L of the second side 202, the considerable dimension of the driving mechanism along the X axis owing to the protrusion 41 and the sensing magnet M3 can be reduced, whereby miniaturization and balance of the driving mechanism can be both achieved.

Figure 9:
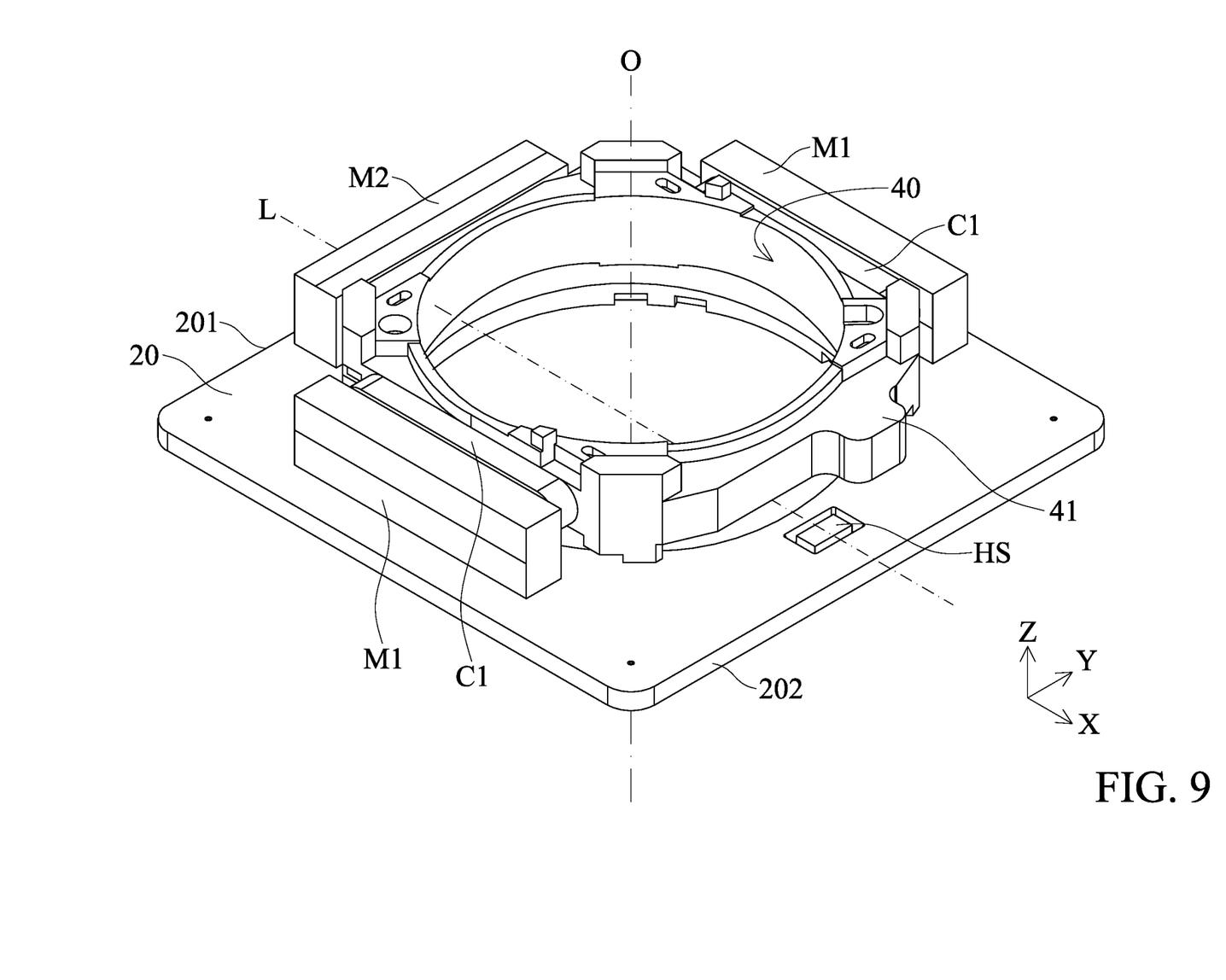
FIG. 9 is a schematic diagram showing some components of a driving mechanism in accordance with another embodiment of the application.

FIG. 9 is a schematic diagram showing some components of a driving mechanism in accordance with another embodiment of the application. FIG. 9 is different from FIG. 8 in that the center of the magnetic field sensor HS is located on a central line L of the second side 202 of the base unit, and the protrusion 41 of the holder 40 and the sensing magnet M3 in the protrusion 41 are offset from the center of the side 202 of the base unit and the magnetic field sensor HS along the Y axis.

In this embodiment, though the sensing magnet M3 is slightly offset from the magnetic field sensor HS along the Y axis, the magnetic field sensor HS can still detect the sensing magnet M3 to obtain the displacement amount of holder 40 relative to the base unit along the Z axis. Since the protrusion 41 of the holder 40 and the sensing magnet M3 efficiently occupy the space beside the central line L of the second side 202, miniaturization and weight balance of the driving mechanism can still be achieved.

Figure 10:
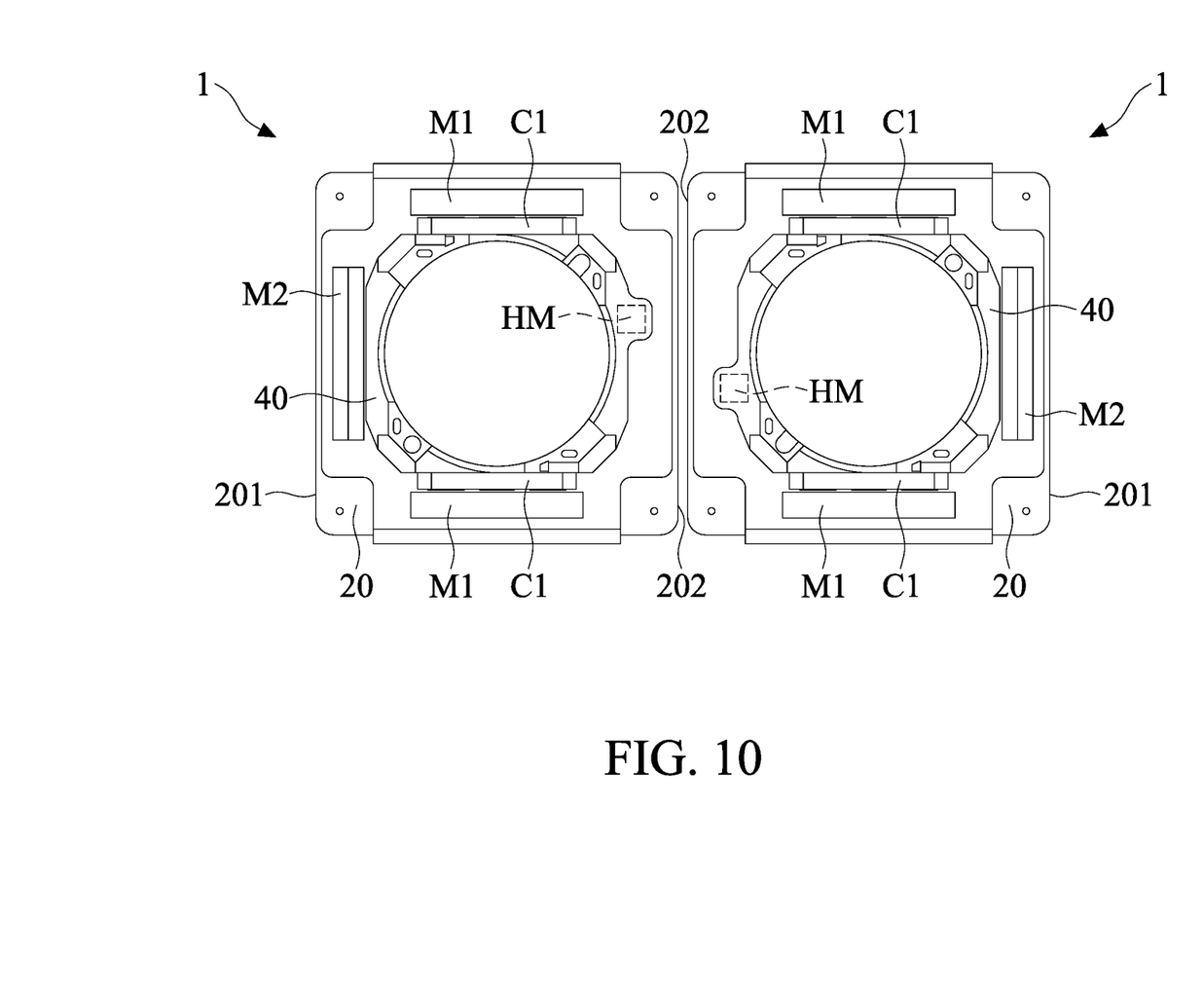
FIG. 10 is a schematic diagram showing a driving module in accordance with another embodiment of the application.

FIG. 10 is a schematic diagram showing a driving module in accordance with another embodiment of the application. The driving module in FIG. 10 comprises two driving mechanisms 1 as disclosed on FIG. 8 or FIG. 9, The two driving mechanisms 1 are arranged in a direction, wherein the protrusions 41 of the holders 40 and the sensing magnets M3 in the protrusions 41 are offset from the centers of the sides 202 of the two base units, whereby miniaturization and weight balance of the mechanism can be both achieved. Furthermore, since no driving assembly including large magnet and coil is disposed close to the second sides 202 of the base units, the magnetic interference between the two driving mechanisms 1 can be efficiently prevented, whereby rapid focus and high positioning accuracy of the camera can be achieved. Here, the second sides 202 of the base units of the two driving mechanisms 1 are adjacent to each other.

Figure 11:
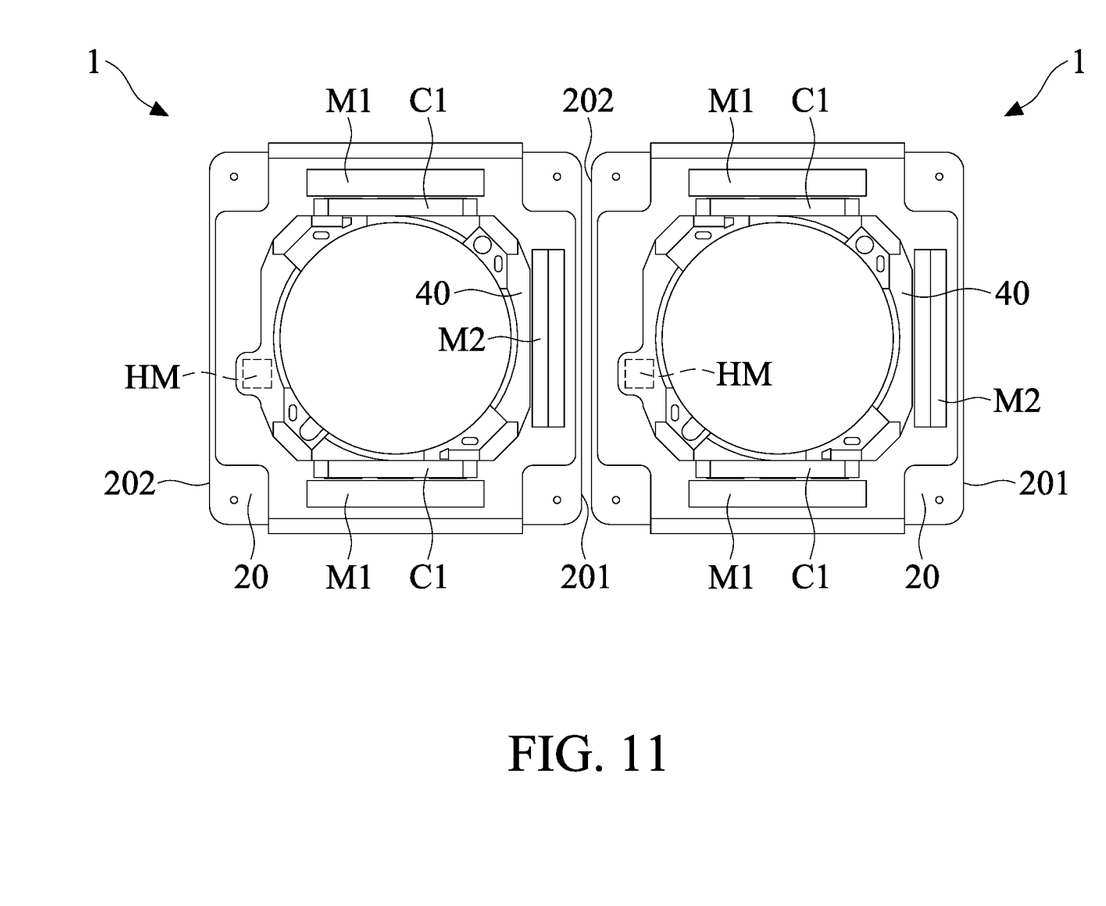
FIG. 11 is a schematic diagram showing a driving module in accordance with another embodiment of the application.

FIG. 11 is a schematic diagram showing a driving module in accordance with another embodiment of the application. The driving module in FIG. 11 is different from FIG. 10 in that the second sides 202 of the base units of the two driving mechanisms 1 face in the same direction.

Similar to the embodiment of FIG. 10, no driving assembly including large magnet and coil is disposed close to the second sides 202 of the two base units. Though the second side 202 of the base unit in a driving mechanism 1 is close to the magnetic element M2 in the other driving mechanism 1, serious magnetic interference between the two driving mechanisms 1 can still be avoided. Thus, the flexibility of mechanism design can be greatly increased.

Figure 12:
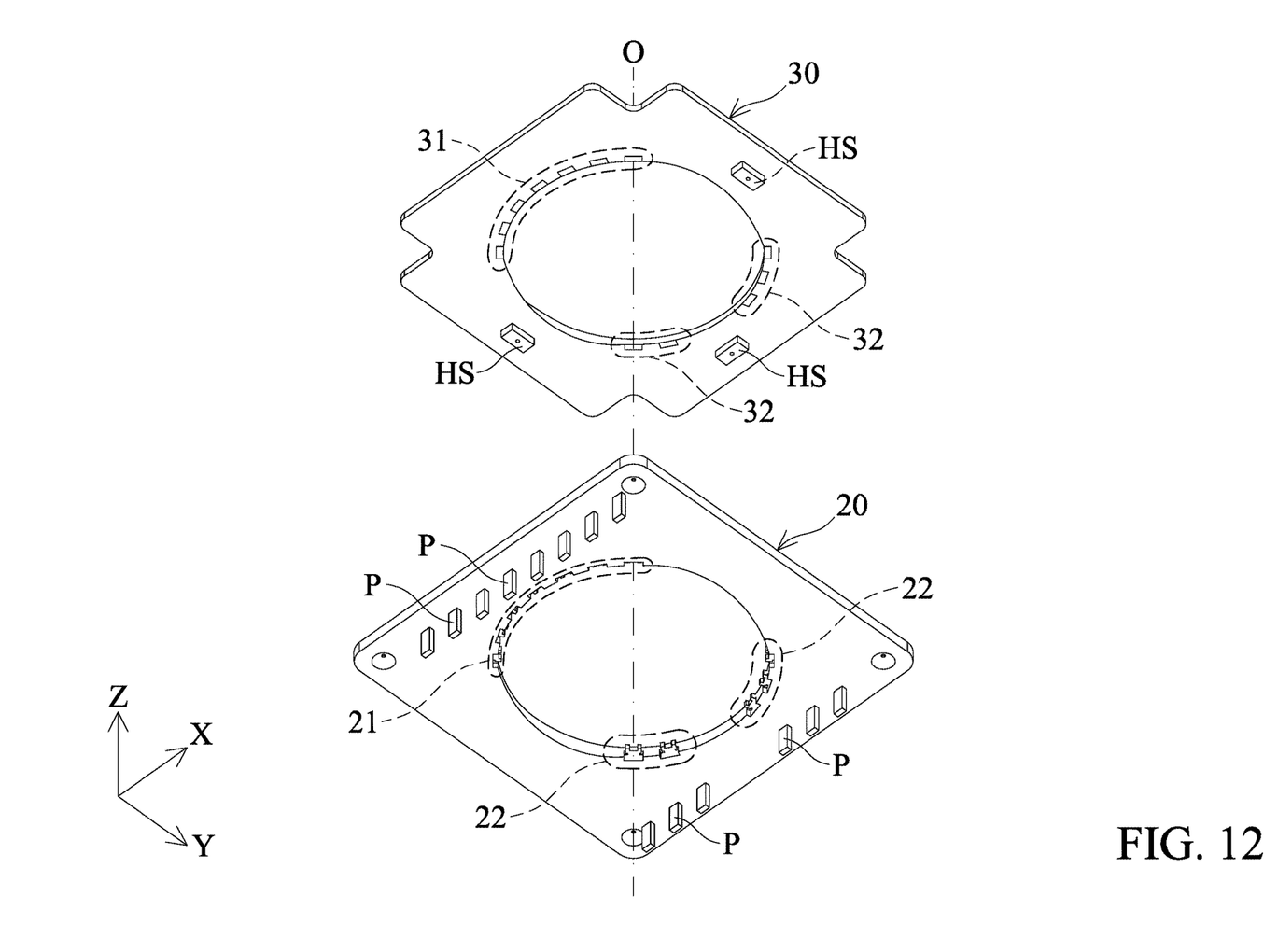
FIGS. 12 and 13 are exploded diagrams showing a base unit in accordance with another embodiment of the application.
Figure 13:
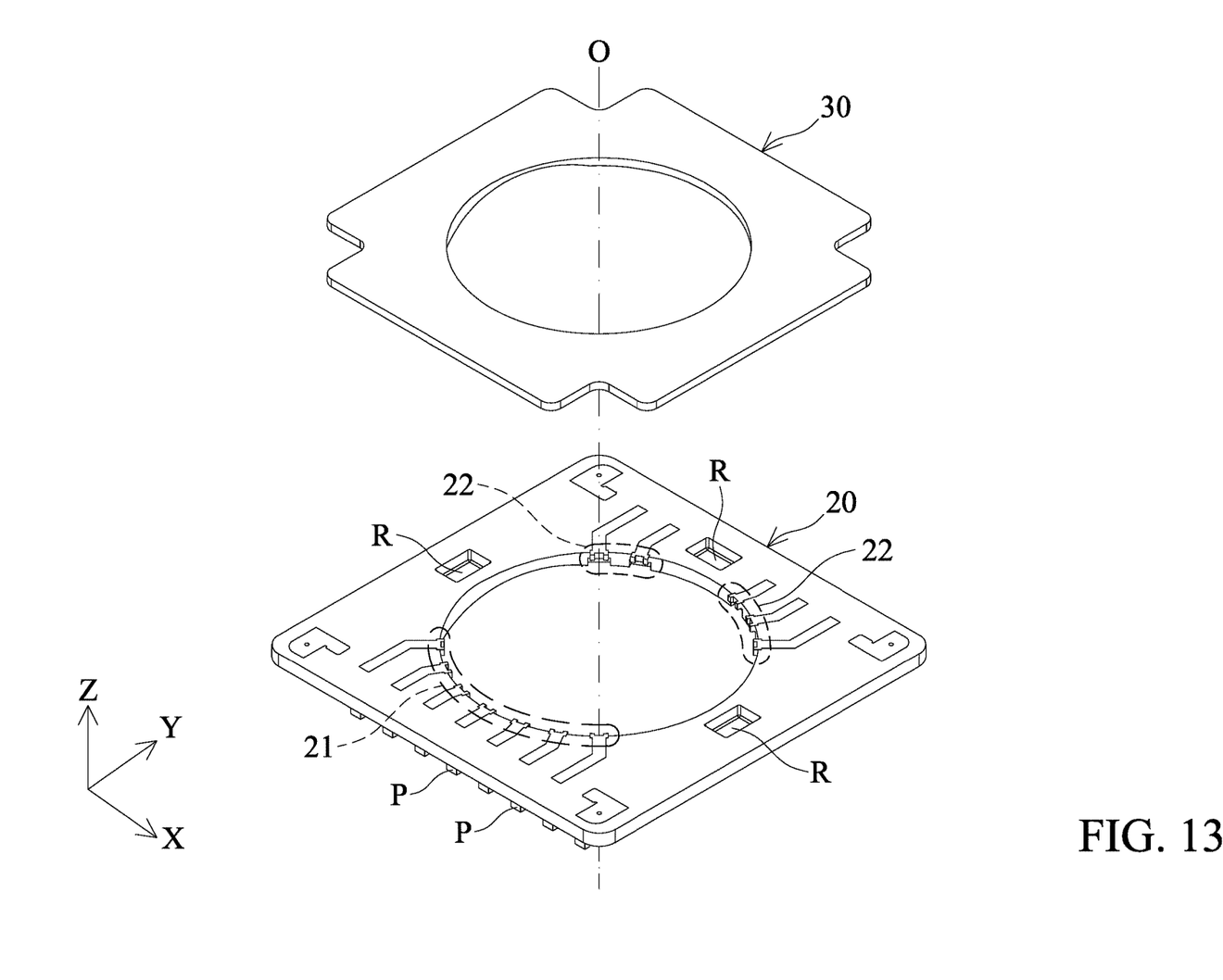

FIGS. 12 and 13 are exploded diagrams showing a base unit in accordance with another embodiment of the application. The base unit of FIGS. 12 and 13 comprises a substrate 20 and a circuit board 30, and it can substitute for the substrate 20 and the circuit board 30 (base unit) in FIG. 1.

As shown in FIG. 12, several magnetic field sensors HS are disposed on the bottom side of the circuit board 30 to detect the magnet M1, the magnetic element M2, and the sensing magnet M3. Specifically, a plurality of first and second pads 21 and 22 are exposed to an inner surface of an opening of the substrate 20, and they can be electrically connected to an external circuit via the conductive pins P.

It should be noted that the first pads 21 are adjacent to each other, and the second pads 22 are adjacent to each other, wherein the first and second pads 21 and 22 are located on opposite sides of the opening for electrically connecting to the first and second conductive portions 31 and 32 which are exposed to the bottom of the circuit board 30. The first and second conductive portions 31 can electrically connect to the magnetic field sensors HS via the electrical circuits inside the circuit board.

As shown in FIG. 13, the substrate 20 forms at least a recess R for receiving the magnetic field sensor HS, so that the dimension of the driving mechanism 1 along the Z axis can be reduced to facilitate miniaturization of the mechanism.

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A driving mechanism, comprising:
   a base unit, having a polygonal structure;
   a frame, connected to the base unit,
   a holder, connected to the frame for holding an optical element, wherein the optical element defines an optical axis;
   a first driving assembly, disposed on the base unit and the frame, close to a first side of the base unit for driving the holder and the frame to move relative to the base unit along a horizontal direction perpendicular to the optical axis;
   a sensing magnet, disposed on the holder and close to a second side of the base unit, opposite to the first side; and
   a magnetic field sensor, disposed on the base unit for sensing the sensing magnet.

2. The driving mechanism as claimed in claim 1, wherein the driving mechanism comprises only one first driving assembly, and the first driving assembly is not located close to the second side of the base unit.

3. The driving mechanism as claimed in claim 1, wherein the first side is parallel to the second side, and the center of the sensing magnet is offset from the center of the second side.

4. The driving mechanism as claimed in claim 1, wherein when viewed along the optical axis, the sensing magnet has a round, square, or rectangular shape.

5. The driving mechanism as claimed in claim 1, wherein the base unit includes a substrate and a circuit board disposed on the substrate, and the first driving assembly includes a magnetic element and a coil, wherein the magnetic element is disposed on the frame, and the coil is disposed on the circuit board and corresponds to the magnetic element.

6. The driving mechanism as claimed in claim 5, wherein the magnetic field sensor is disposed on the substrate.

7. The driving mechanism as claimed in claim 5, wherein the magnetic field sensor is disposed on the circuit board, and the substrate has at least a conductive pin electrically connected to the magnetic field sensor.

8. The driving mechanism as claimed in claim 7, wherein the substrate further has a recess with the magnetic field sensor received therein.

9. The driving mechanism as claimed in claim 7, wherein the circuit board electrically connects the conductive pin with the magnetic field sensor.

10. The driving mechanism as claimed in claim 5, wherein the substrate further has an opening, a group of first pads adjacent to each other, and a group of second pads adjacent to each other, wherein the first and second pads are exposed to an inner surface of the opening and electrically connected to the circuit board.

11. The driving mechanism as claimed in claim 10, wherein the first and second pads are located on opposite sides of the opening.

12. The driving mechanism as claimed in claim 1, wherein the center of the magnetic field sensor is offset from the center of the sensing magnet in the horizontal direction.

13. The driving mechanism as claimed in claim 1, wherein the polar direction of the sensing magnet is parallel to the optical axis.

14. The driving mechanism as claimed in claim 1, further comprising a block disposed on the frame and corresponding to the second side of the base unit.

15. The driving mechanism as claimed in claim 14, wherein when the holder moves relative to the frame along the horizontal direction to a limit position, the block contacts and restricts the holder in the limit position.

16. The driving mechanism as claimed in claim 14, wherein when viewed along a direction parallel to the second side, the block and the sensing magnet at least partially overlap.

17. The driving mechanism as claimed in claim 1, further comprising two blocks and a metal sheet connecting to the blocks, wherein the blocks are disposed on the frame and correspond to the second side of the base unit.

18. The driving mechanism as claimed in claim 1, wherein the holder has an extending portion overlapping with the first driving assembly when viewed along the optical axis.

19. The driving mechanism as claimed in claim 1, wherein the center of the magnetic field sensor is offset from the center of the sensing magnet along a direction perpendicular to the horizontal direction and the optical axis.

20. A driving module, comprising:
   two driving mechanisms as claimed in claim 1, wherein the second sides of the base units of the two driving mechanisms are adjacent to each other.

21. A driving module, comprising:
   two driving mechanisms as claimed in claim 1, wherein the driving mechanisms are arranged in a direction, and the second sides of the base units of the two driving mechanisms face in the direction.

22. A driving module, comprising:
   four driving mechanisms as claimed in claim 1, wherein the driving mechanisms are arranged in a 2×2 matrix, and each of the driving mechanisms further comprises a second driving assembly disposed on the holder and the frame, wherein the second driving assembly is close to a third side of the base unit for driving the holder to move relative to the frame along the optical axis.

23. The driving module as claimed in claim 22, wherein each of the driving mechanisms comprises only one second driving assembly, and the second driving assembly is not close to a fourth side of the base unit, wherein the fourth side is opposite to the third side, and the second and fourth sides of the base units of the four driving mechanisms are adjacent to each other.

* * * * *